(12) United States Patent
Gabriel et al.

(10) Patent No.: US 9,253,076 B2
(45) Date of Patent: Feb. 2, 2016

(54) SYNCHRONIZATION OF LOAD-BALANCING SWITCHES

(71) Applicant: INTERNATIONAL BUSINESS MACHINES CORPORATION, Armonk, NY (US)

(72) Inventors: Cynthia A. Gabriel, Gilroy, CA (US); Bill Shao, Pleasanton, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 88 days.

(21) Appl. No.: 14/071,394

(22) Filed: Nov. 4, 2013

(65) Prior Publication Data

US 2014/0059176 A1  Feb. 27, 2014

Related U.S. Application Data (63) Continuation of application No. 13/494,467, filed on Jun. 12, 2012.

(51) Int. Cl.
| | |
|---|---|
| *G06F 15/16* | (2006.01) |
| *H04L 12/755* | (2013.01) |
| *H04L 12/24* | (2006.01) |
| *H04L 29/08* | (2006.01) |

(52) U.S. Cl.
CPC .......... *H04L 45/021* (2013.01); *H04L 41/0246* (2013.01); *H04L 41/044* (2013.01); *H04L 67/1004* (2013.01); *H04L 67/1095* (2013.01)

(58) Field of Classification Search
CPC .............. H04L 45/021; H04L 67/1004; H04L 67/1095; H04L 41/0246; H04L 41/044

USPC .......... 709/218, 232, 225, 208, 217; 370/401, 370/230, 218, 241, 395.31, 357, 390
See application file for complete search history.

(56) References Cited

U.S. PATENT DOCUMENTS

| | | | |
|---|---|---|---|
| 6,715,098 B2 | 3/2004 | Chen et al. | |
| 6,983,363 B2 | 1/2006 | Coffey | |
| 7,138,733 B2 | 11/2006 | Sanders et al. | |
| 7,352,745 B2 | 4/2008 | Perera et al. | |
| 7,627,780 B2 | 12/2009 | Davies | |
| 8,593,987 B2 | 11/2013 | Kuo et al. | |
| 8,938,521 B2 * | 1/2015 | Gabriel et al. ................ | 709/219 |
| 8,958,293 B1 * | 2/2015 | Anderson .................... | 370/230 |
| 2003/0200330 A1 | 10/2003 | Oelke et al. | |
| 2005/0066060 A1 | 3/2005 | Pinkerton et al. | |
| 2005/0105538 A1 | 5/2005 | Perera et al. | |
| 2006/0092950 A1 | 5/2006 | Arregoces et al. | |
| 2006/0195532 A1 | 8/2006 | Zlateff et al. | |

(Continued)

OTHER PUBLICATIONS

IBM, Mechanism for Load Balancing with low cost layer-2 switches and enhancing the load balancing capability of low end devices, Ip.com PriorArt database, Dec. 18, 2008, IPCOM000177581D.

(Continued)

*Primary Examiner* — Jungwon Chang
(74) *Attorney, Agent, or Firm* — Shimokaji IP (57) ABSTRACT

A network element within a data center comprises a master switch, a slave switch, and a plurality of servers in communication with the master and slave switches. The master switch may be configured to send synchronization requests to the slave switch. The slave switch may update a slave switch hash table to correspond to a master switch hash table.

5 Claims, 8 Drawing Sheets

(56) References Cited

U.S. PATENT DOCUMENTS

| | | |
|---|---|---|
| 2007/0127457 A1 | 6/2007 | Mirtorabi et al. |
| 2007/0230330 A1 | 10/2007 | Dietz et al. |
| 2008/0247399 A1* | 10/2008 | Hazard .................... 370/395.31 |
| 2009/0129398 A1* | 5/2009 | Riegel et al. .................. 370/401 |
| 2010/0281178 A1 | 11/2010 | Sullivan |
| 2011/0283013 A1* | 11/2011 | Grosser et al. ................ 709/232 |
| 2012/0047249 A1 | 2/2012 | Bharadwaj et al. |
| 2012/0075988 A1* | 3/2012 | Lu et al. ........................ 370/218 |
| 2012/0150819 A1 | 6/2012 | Lindahl et al. |
| 2012/0230201 A1* | 9/2012 | Thota et al. ................... 370/241 |
| 2013/0103834 A1* | 4/2013 | Dzerve et al. ................. 709/225 |
| 2013/0194964 A1 | 8/2013 | Basso et al. |
| 2013/0201875 A1 | 8/2013 | Anantharam et al. |
| 2013/0201983 A1 | 8/2013 | Ghosh et al. |
| 2013/0259047 A1 | 10/2013 | Bhagavathiperumal et al. |
| 2013/0332555 A1 | 12/2013 | Gabriel et al. |
| 2014/0059176 A1 | 2/2014 | Gabriel et al. |
| 2014/0067983 A1 | 3/2014 | Gabriel et al. |

OTHER PUBLICATIONS

IBM TDB, Load Balancer—Switch—Interface, Ip.com PriorArt database, Jun. 20, 2003, IPCOM000015499D.
Office Action in U.S. Appl. No. 13/494,467, dated Sep. 24, 2014.
Notice of allowance in U.S. Appl. No. 13/494,467 dated Aug. 7, 2015.
Notice of allowance in U.S. Appl. No. 13/494,467 dated May 11, 2015.

* cited by examiner

SYNCHRONIZATION OF LOAD-BALANCING SWITCHES

RELATED APPLICATIONS

The present continuation application claims the benefit of priority of U.S. application Ser. No.: 13/494,467, filed Jun. 12, 2012, which application is incorporated herein by reference in its entirety.

BACKGROUND

The present invention relates to data processing, and more specifically, to synchronization of load balancing switches.

Data centers are generally centralized facilities that provide Internet and intranet services needed to support businesses and organizations. A typical data center can house various types of electronic equipment, such as computers, servers (e.g., email servers, proxy servers, and DNS servers), switches, routers, data storage devices, and other associated components. In addition, data centers typically deploy network security components, such as firewalls, VPN (virtual private network) gateways, and intrusion detection systems.

In traditional networking, routers and switch devices usually refer to tables to track data passing through servers. The data center may employ a network element consisting of both an ingress switch and an egress switch to handle data passing through servers. The ingress and egress switches may work independently of each other to handle distinct packet routing responsibilities; one to forward a packet to a server or servers and one to forward the packet out of the network element.

In some networking approaches, redundancy of switches may be employed as a fail-safe mechanism in case a primary switch falters. Under an Active-Passive scheme, the redundant component may be operated only when its associated primary component fails. This may be considered inefficient because the redundant component is idle most of the time.

SUMMARY

According to one embodiment of the present invention, a network element within a data center comprises a master switch; a slave switch; and a plurality of servers in communication with the master and slave switches, wherein the master switch is configured to send synchronization requests to the slave switch to update a slave switch hash table to correspond to a master switch hash table.

According to another embodiment of the present invention, a process of synchronizing switches in a network element comprises determining whether an external synchronization event is being made on the network element; updating a hash table of a master switch based on the external synchronization event; sending a health check request from the master switch to a slave switch; determining availability of a healthy application server from the health check request; sending a synchronization update request from the master switch to the slave switch through the healthy application server; and updating a hash table of the slave switch to correspond with the hash table of the master switch.

According to yet another embodiment of the present invention, a master switch in a network element comprises at least one externally facing port configured to receive data; a plurality of server-facing ports configured to communicate with one or more servers; a connection to a slave switch; and a processor configured to synchronize, through the connection, a distribution of packet traffic between the master switch and the slave switch while the master switch is operated to actively process data traffic and the slave switch is operated to actively process data traffic.

According to still yet another embodiment of the present invention, a computer program product for synchronizing load balanced switches in a network element, the computer program product comprising a computer readable storage medium having computer readable program code embodied therewith, the computer readable program code being configured to: determine whether a master switch and a slave switch are processing data traffic through the network element in active-active mode; determine whether an external synchronization event is being made on the network element; send a health check request from the master switch to the slave switch; determine availability of a healthy application server between the master switch and the slave switch, from the health check request; send a synchronization update request from the master switch to the slave switch through the available healthy application server; and synchronize the slave switch with application data to correspond with application data in the master switch.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As generally described herein, the network elements of a data center employ traffic orchestration mechanisms for dynamically controlling the distribution of packet traffic into and from a server in the data center.

Figure 1:
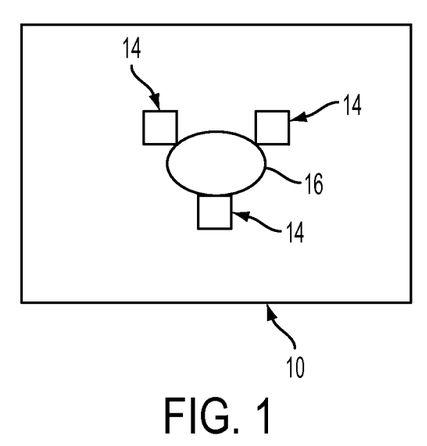
FIG. 1 is a block diagram of a networking environment including a data center with a plurality of network elements in accordance with an exemplary embodiment of the present invention.

Referring now to FIG. 1, the data center 10 is generally a facility that houses various computers, routers, switches, and other associated equipment in support of applications and data that are integral to the operation of a business, organization, or other entities. The data center 10 may include a plurality of network elements 14 in communication with each other over a network 16 of communication links. Each of the network elements 14 may be independent (standalone) electronic enclosures. The data center 10 can have fewer or more than the three network elements 14 shown. In addition, embodiments of the data center 10 may be at a single site or distributed among multiple sites.

Figure 2:
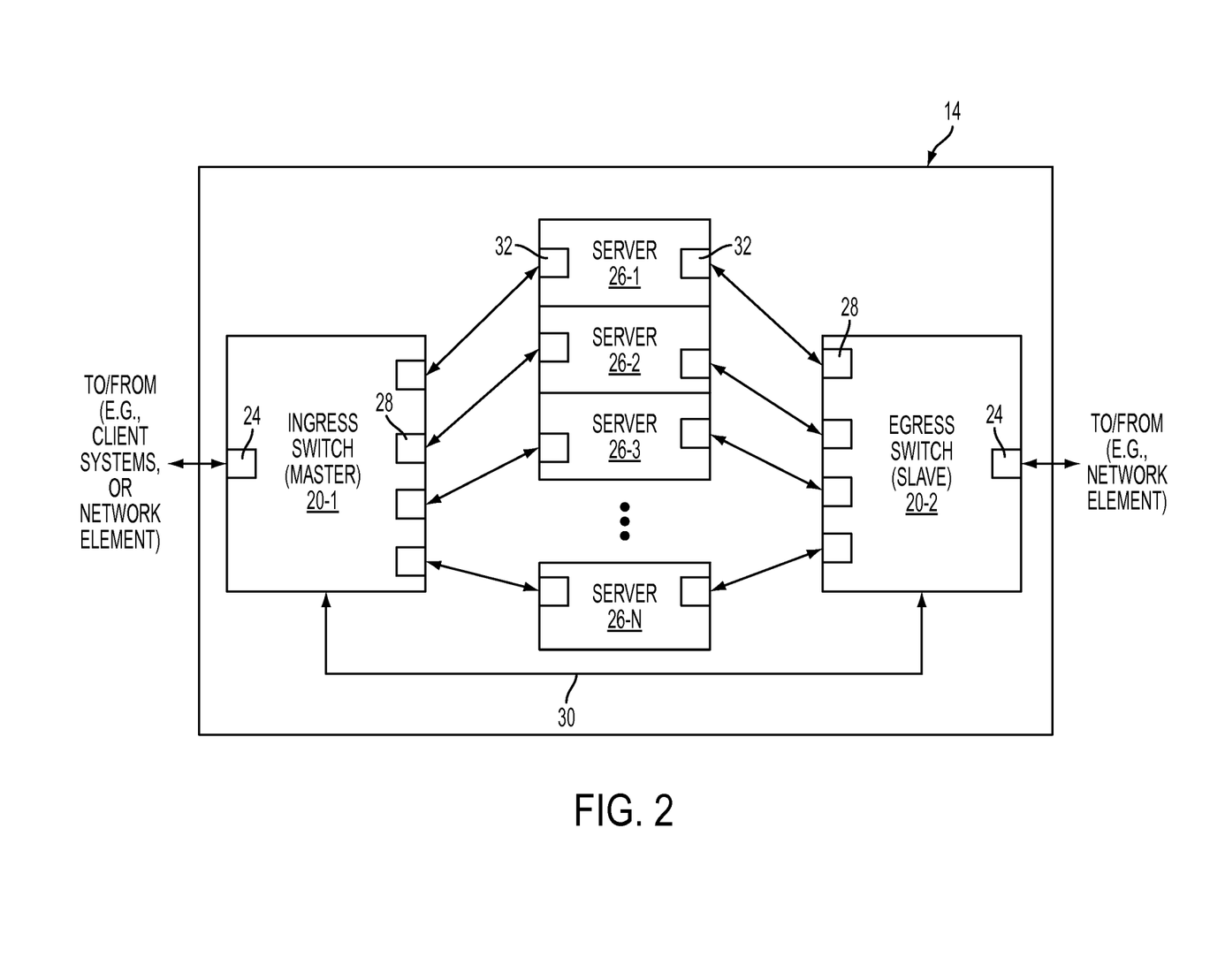
FIG. 2 is a functional block diagram of an embodiment of a network element of FIG. 1.

Referring now to FIG. 2, the network element 14 may be a system providing bi-directional data processing for packet traffic within the data center 10. The network element 14 may include a plurality of servers 26-1, 26-2, 26-3, 26-N (generally, 26).

Each server 26 may be in communication with an ingress switch 20-1 and an egress switch 20-2. The ingress switch 20-1 may be referred to as the master switch; the egress switch 20-2, as the slave. In another aspect, the data center may be configured for active-active operation where both the master switch 20-1 and slave switch 20-2 are actively processing traffic. The master switch 20-1 and the slave switch 20-2 may operate under a heterogeneous software environment. A heterogeneous software environment may be when the software is running on each switch (20-1, 20-2) independently. For example, the configuration may be the same on each switch (20-1, 20-2), but the processing order, steps, and/or timing may be different on independent switches). A heterogeneous software environment may be when the software being processed on the different servers 26 may return information to the switch (20-1 or 20-2) under different applications, for example, different health check metrics. The master switch 20-1 may receive incoming packets, arriving either from client systems (when the master switch 20-1 is at an ingress location of the network element 14) within a data center 10 or from other network elements 14 within the data center 10, and may forward the packets to servers 26 within the network element 14. In an exemplary embodiment, the slave switch 20-2 may receive packet traffic from the servers 26 and forward the packet traffic outside of the network element 14 to other network elements 14 within the data center 10. In another exemplary embodiment, the slave switch 20-2 may receive incoming packets external from the network element 14, arriving either from client systems or from other network elements 14 within the data center 10, similar to the master switch 20-1, and forward the packets to servers 26 within the network element 14.

In general, the networking element 14 may provide switching and server services for packet traffic from the client systems. Through an external management agent (not shown), an administrator of the data center 10 may communicate with one or more network elements 14 in order to manage the packet distribution. A management station (not shown) may connect directly (point-to-point) or indirectly to a given network element 14 of the data center 10 over one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11 (g), 802.11(n)). Using a network protocol, such as Telnet or SNMP (Simple Network Management Protocol), the management station (not shown) may access a command-line interface (CLI) of the given network element 14.

Each server 26 may be a computer that provides one or more services to the data center 10, examples of which may include email servers, proxy servers, DNS servers, proxy appliances, or real servers. Examples of services that may be provided by the servers 26 include firewall services, Intrusion Prevention/Intrusion Detection (IPS/IDS) services, Server Load Balancing (SLB), and Application Delivery Centers (ADC) services. All of the servers 26 in the network element 14 may or may not perform the same function.

Each switch 20-1, 20-2 (generally, 20) may include at least one externally facing port 24 and a plurality of server-facing ports 28. In an exemplary embodiment, the switch 20 may be an Ethernet switch and the ports 24, 28 of the switch may support 10

GB line rates. For a network element 14 at an ingress location of the data center 10, the externally facing port 24 of the master switch 20-1 may be in communication with the client systems. For network elements not at an ingress location, the externally facing port 24 of the master switch 20-1 may be in communication with another network element 14. The externally facing port 24 of the slave switch 20-2 may be in communication with another network element 14 or with client systems. The master and slave switches 20 may have more than one externally facing port 24. Each of the server-facing ports 28 of the master and slave switches 20 may be connected to a port 32 of a server 26. In addition, the master switch 20-1 and slave switch 20-2 may be in communication with each other over an inter-switch network link 30 which may be a dedicated physical path or a dynamically selected path through one of the server-facing ports 28. The network link 30 for example, may provide a path to send health checks and/or synchronization information from the master switch 20-1 to the slave switch 20-2. The master switch 20-1 and slave switch 20-2 may operate independently of each other populating respective hash tables with information from their respective packet traffic. Under a heterogeneous software environment, and in particular, under an active-active mode of operation, the hash tables between the master switch 20-1 and the slave switch 20-2 may benefit from synchronization. Computer program instructions may be resident on each of the master switch 20-1 and the slave switch 20-2. The computer program instructions may provide messages across the servers 26 for coordinating synchronization between the master switch 20-1 and the slave switch 20-2. The computer program instructions may be resident on a processor in the master switch 20-1 and on a processor in the slave switch 20-2 or may be implemented from an external source.

During active-active mode, the ingress switch 20-1 and egress switch 20-2 may be each configured to provide independent, bi-directional pack routing while maintaining server state among the servers 26. It may be appreciated that the bi-directional servicing of the switches 20 may provide increased bandwidth processing within the data center 10. In general, the switches 20 may be configured so that a server 26 connected to one or both of the switches 20 may be enabled to receive and return traffic to the same switch. For example, the ingress switch 20-1 may receive a packet over the externally facing port 24 and routes the packet to one of the servers 26. The server 26 may perform its designated service or services. The server 26 may direct the packet back to the ingress switch 20-1 when processed. The ingress switch 20-1 may forward the packet out of the network element 14 through one or more of its externally facing ports 24. Similarly, the egress switch 20-2 may receive a packet over the externally facing port 24 and distribute the packet traffic across the servers 26. The egress switch 20-2 may process and route the packet to one of the servers 26 where the server 26 performs its designated service or services. The server 26 may direct the packet back to the egress switch 20-2 when processed. The egress switch 20-2 may forward the packet out of the network element 14 through one or more of its externally facing ports 24.

Figure 3:
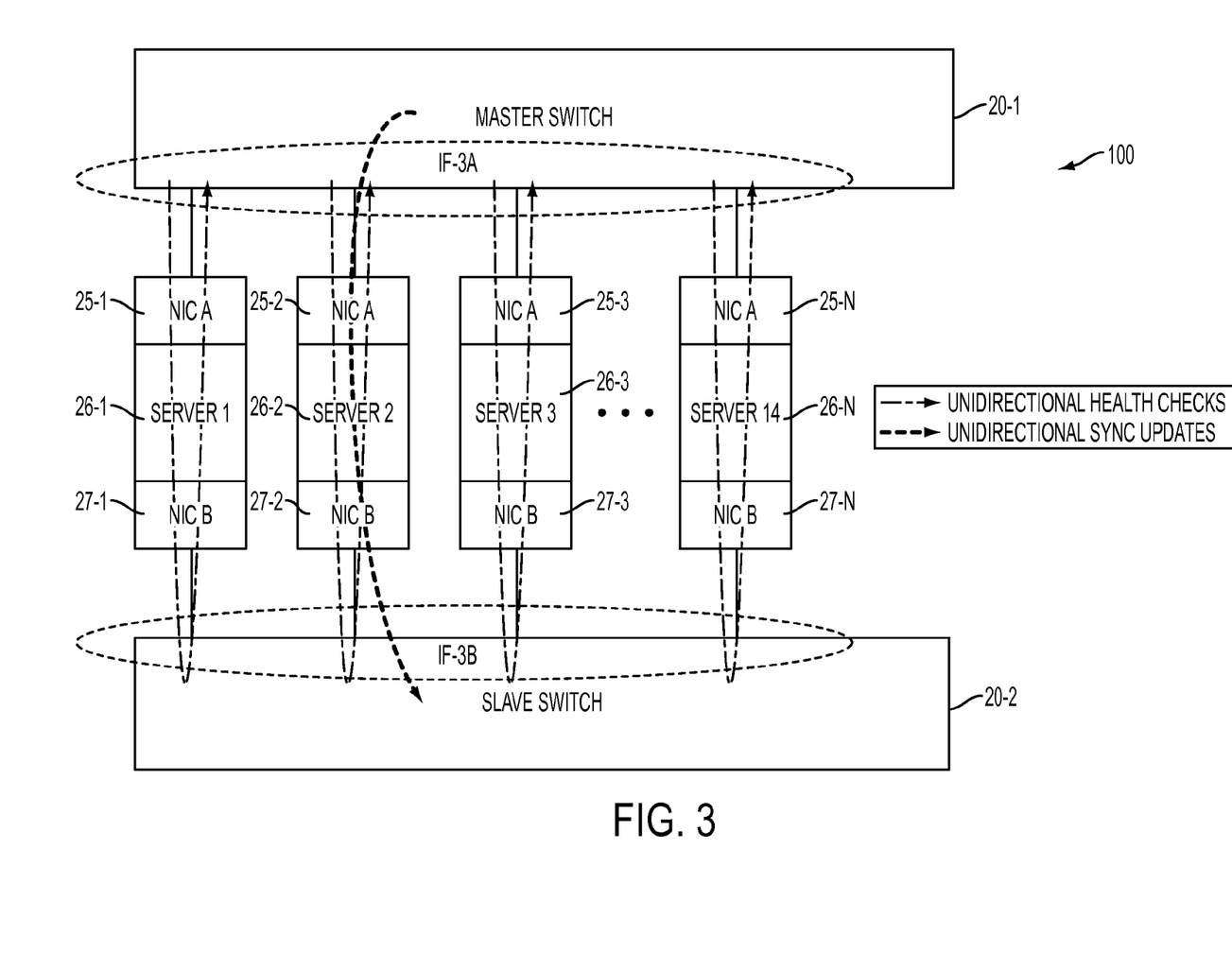
FIG. 3 is a block diagram of a process employing a health check request and synchronization update of switches within the network element of FIG. 2 in accordance with another exemplary embodiment of the present invention.

Referring now to FIG. 3, a system 100 of synchronization may include the master switch 20-1, the slave switch 20-2, and the plurality of servers 26-1, 26-2, 26-3, 26-N (generally 26). Each server 26 may include an ingress network interface card (NIC) 25-1, 25-2, 25-3, 25N (generally 25) interfacing the master switch 20-1 to the servers 26. The servers 26 may also include an egress NIC 27-1, 27-2, 27-3, 27-N (generally 27) interfacing the slave switch 20-2 to the servers 26. The system 100 may allow the master switch 20-1 to perform health checks across the servers 26 as well as to automatically perform an application hash table/bucket synchronization to the slave switch 20-2 on a periodic or event driven basis. In addition, the master switch 20-1 may check for hash table congruence with the slave switch 20-2.

Figure 4:
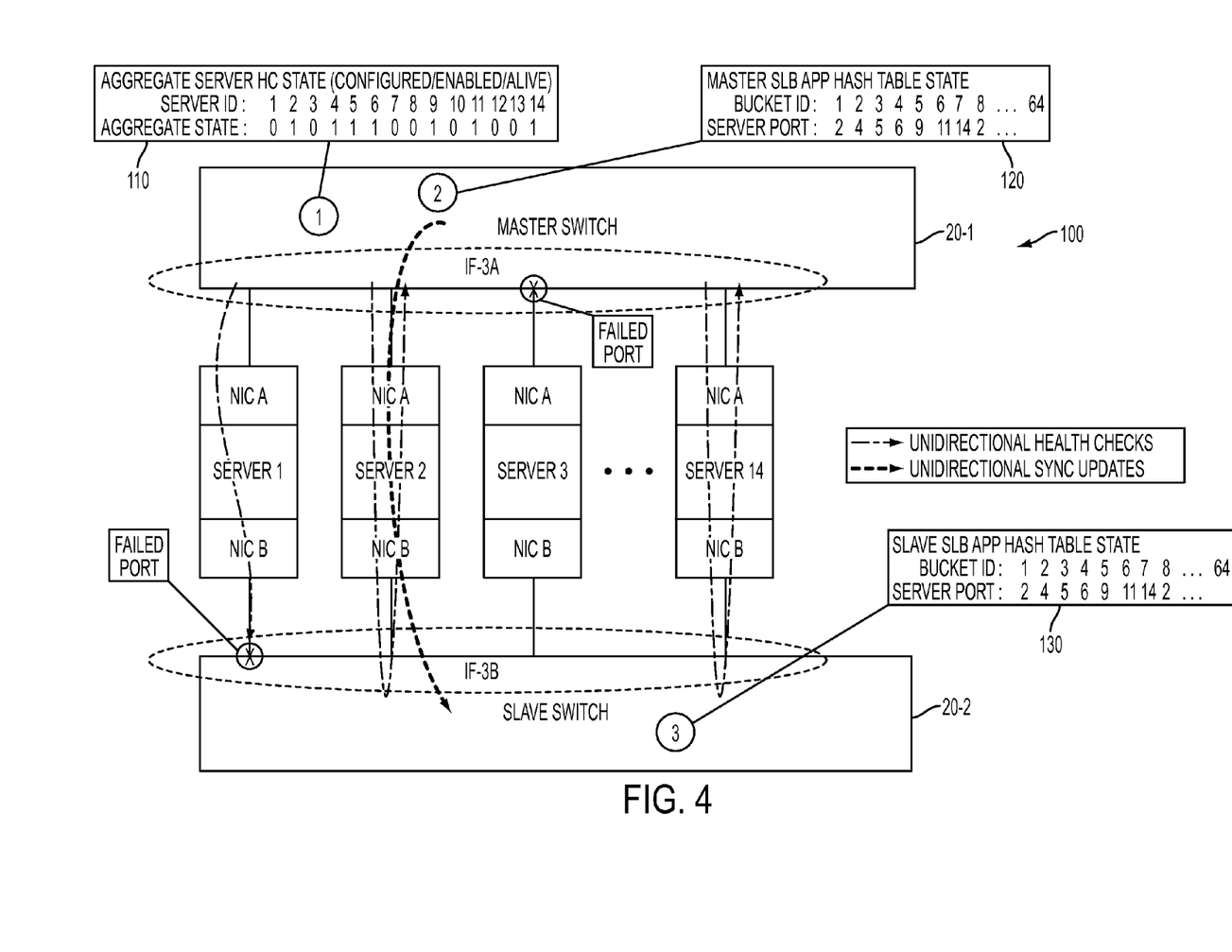
FIG. 4 is a block diagram of the process of FIG. 3 when employing a server load balancing synchronization of switches.

Referring now to FIG. 4, the master switch 20-1 may be configured to send periodic health check requests to, for example, all 14 configured/enabled servers 26 shown. Upon receiving a health check packet on the ingress NIC 25, each server 26 may bridge the health check packet sending them across to the egress NIC 27 peer. Slave switch 20-2 may respond to all health check requests received successfully from the servers 26, which in turn may bridge the response packet and forward it back to the master switch 20-1. For sake of illustration, in the exemplary system 100 health check request shown, health checks performed by the master switch 20-1 may discover that servers 26-2, 26-4, 26-5, 26-6, 26-9, 26-11, and 26-14 are alive and healthy (as shown in aggregate server health check state table 110). The health checks may reflect the aggregate health check state shared between both the master switch 20-1 and slave switch 20-2 due to the inline request/response path. Master switch 20-1 may build a server load balancing (SLB) application hash table 120 using the healthy servers 26 and may select the first available server-facing port 28 in the hash table (index 2 which may map to server-facing port 28-2 in this case) to designate as the inter-switch link 30 (FIG. 2) communication path to send synchronization updates. The master switch 20-1 may update the application hash table locally and send a copy of the table using a synchronization update request to the slave switch 20-2 across server 26-2 on server-facing port 28-2. The synchronization update request from the master switch 20-1 to the slave switch 20-2 may be performed on a periodic interval as well as on an event driven basis. For example, the update request may occur whenever server related states change based on health check, operation, or configuration updates. Upon receiving the synchronization update request, the slave switch 20-2 may compare its own local application hash table 130 with the copy received. If the tables are different, the slave switch 20-2 may perform a local application hash table 130 update using the copy received from the synchronization update request from the master switch 20-1.

Figure 5:
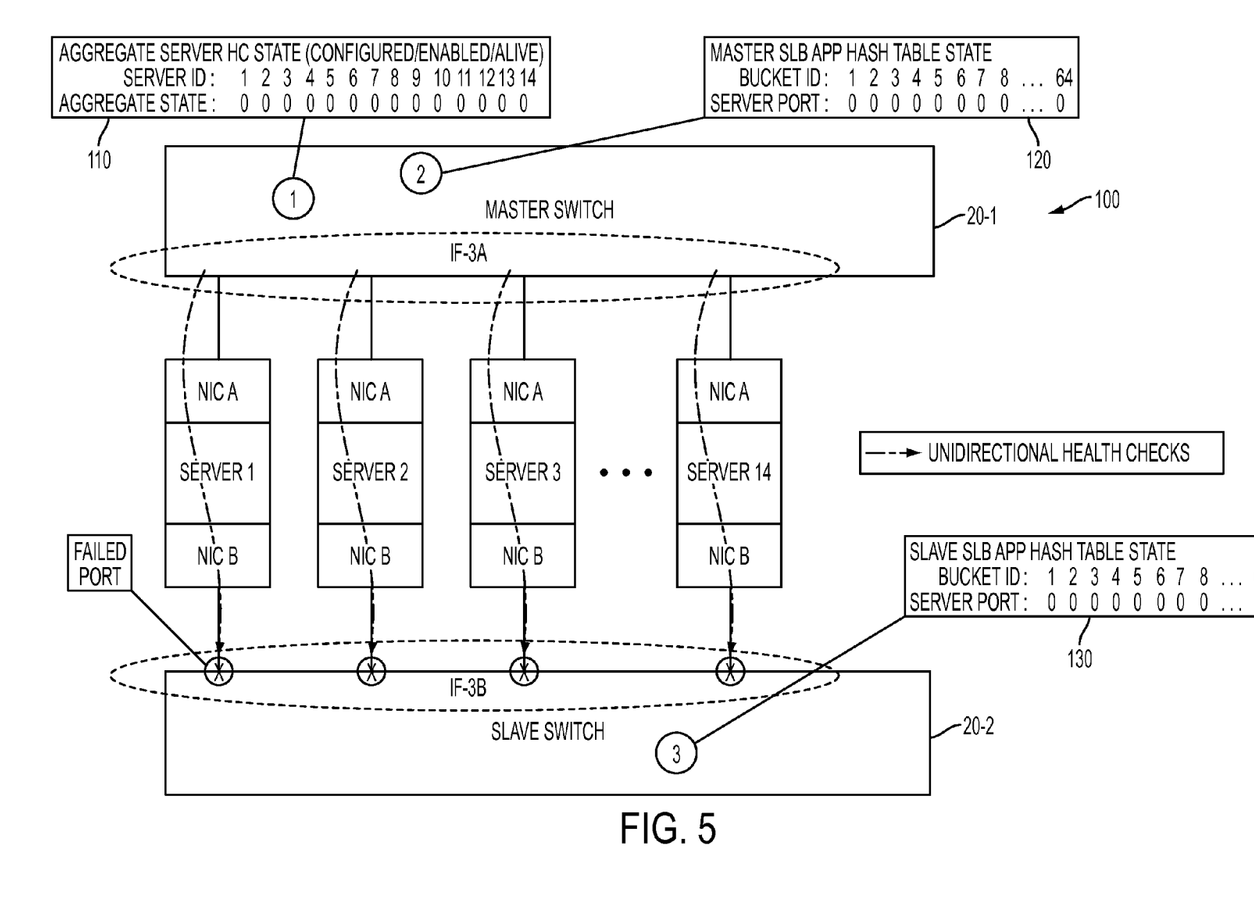
FIG. 5 is a block diagram of the process of FIG. 3 that occurs when a slave switch fails.

Referring now to FIG. 5, the system 100 is shown during a process of handling all failed server-facing ports 28 on the slave switch 20-2. As described in FIG. 3, the master switch 20-1 may be configured to send periodic health check requests to, for example, all 14 configured/enabled servers 26 shown. Upon receiving a health check packet on the ingress NIC 25, each server 26 may bridge the health check packet sending them across to the egress NIC 27 peer. In the event all server-facing ports 28 on the slave switch 20-2 fail, no health check request responses may be returned to the master switch 20-1. As a result, the server health check states on the health check state table 110 may all be marked as failed. The master switch 20-1 may clear the SLB application hash table 120 to the empty state since all servers have failed the health check requests. Hence, the inter-switch link 30 communication path to send the synchronization updates is lost so periodic synchronization update messages to the slave switch 20-2 may cease. Thus, it may be appreciated that the synchronization updates from the master switch 20-1 serves a duo purpose: primarily as a heartbeat to the slave switch 20-2 and secondarily as a data synchronization mechanism. If the slave switch 20-2 is failed, no additional processing may be necessary. If the slave switch 20-2 is operational, a timeout error may occur on the slave switch 20-2 on the periodic synchronization update messages expected from the master switch 20-1. Hence, the slave switch 20-2 may clear its local application hash table 130 in response to the failure. In either case, synchronization of the application hash table between both master switch 20-1 and slave switch 20-2 is maintained.

Figure 6:
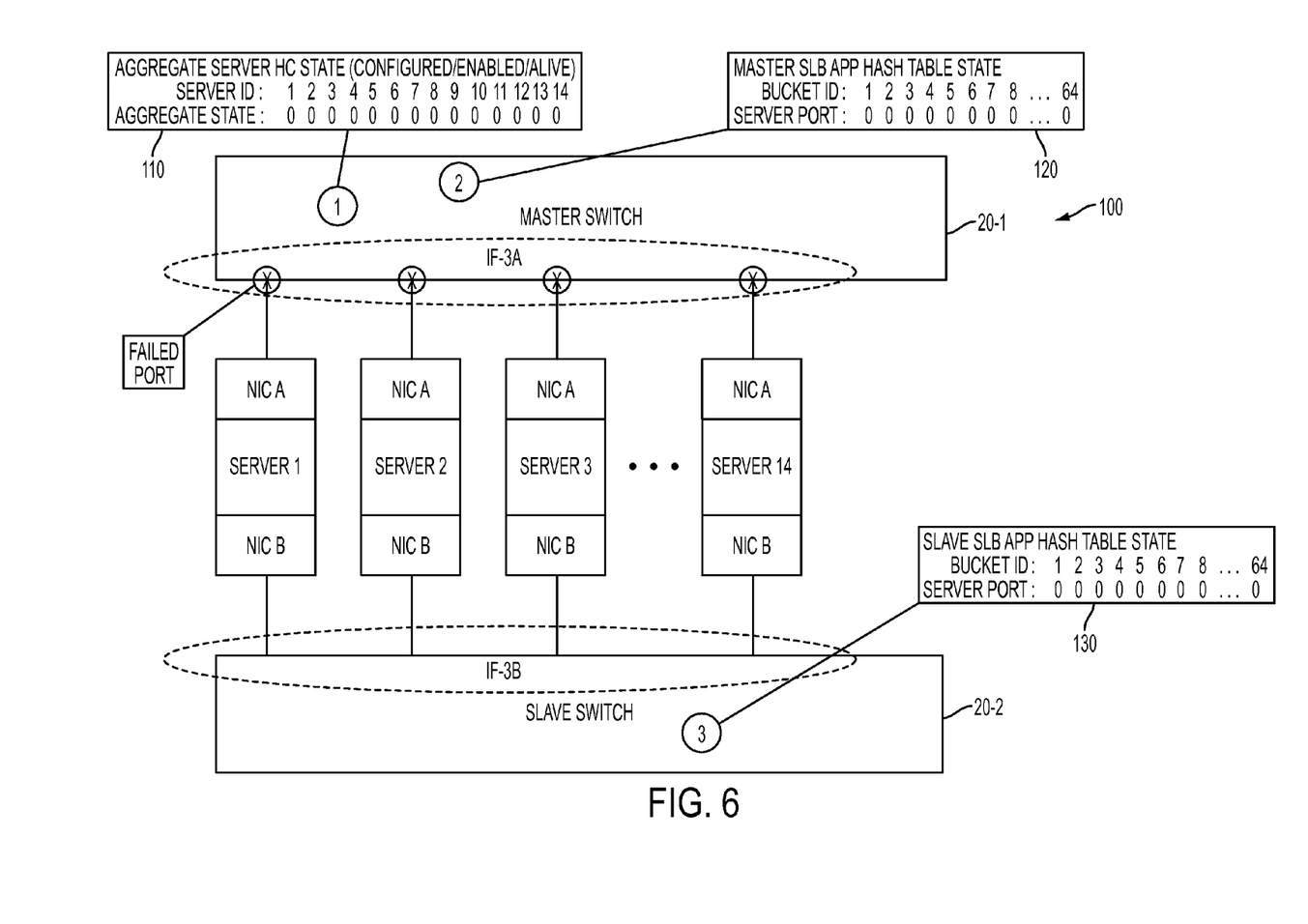
FIG. 6 is a block diagram of the process of FIG. 3 that occurs when the master switch fails.

Referring now to FIG. 6, the system 100 is shown during a process of handling all failed server-facing ports 28 on the master switch 20-1. Should the master switch 20-1 fail, no additional processing may be necessary. For example, if the master switch 20-1 is operational, it may attempt to send periodic health check requests to, for example, all 14 configured/enabled servers 26 shown. Since all server-facing ports 28 on the master switch 20-1 are failed, no health check requests may be sent to the slave switch 20-2. As a result, the server health check states on the health check state table 110 may all be marked as failed. The master switch 20-1 may clear the SLB application hash table 120 to the empty state since all servers have failed the health checks. Hence, the inter-switch link 30 communication path to send the synchronization updates may be lost so periodic synchronization update messages to the slave switch 20-2 may cease. A timeout error on the slave switch 20-2 may occur on the periodic synchronization update messages expected from the master switch 20-1. Hence, the slave switch 20-2 may clear its local application hash table 130 in response to the failure. In either case, synchronization of the application hash table between both master switch 20-1 and slave switch 20-2 is maintained.

Figure 7:
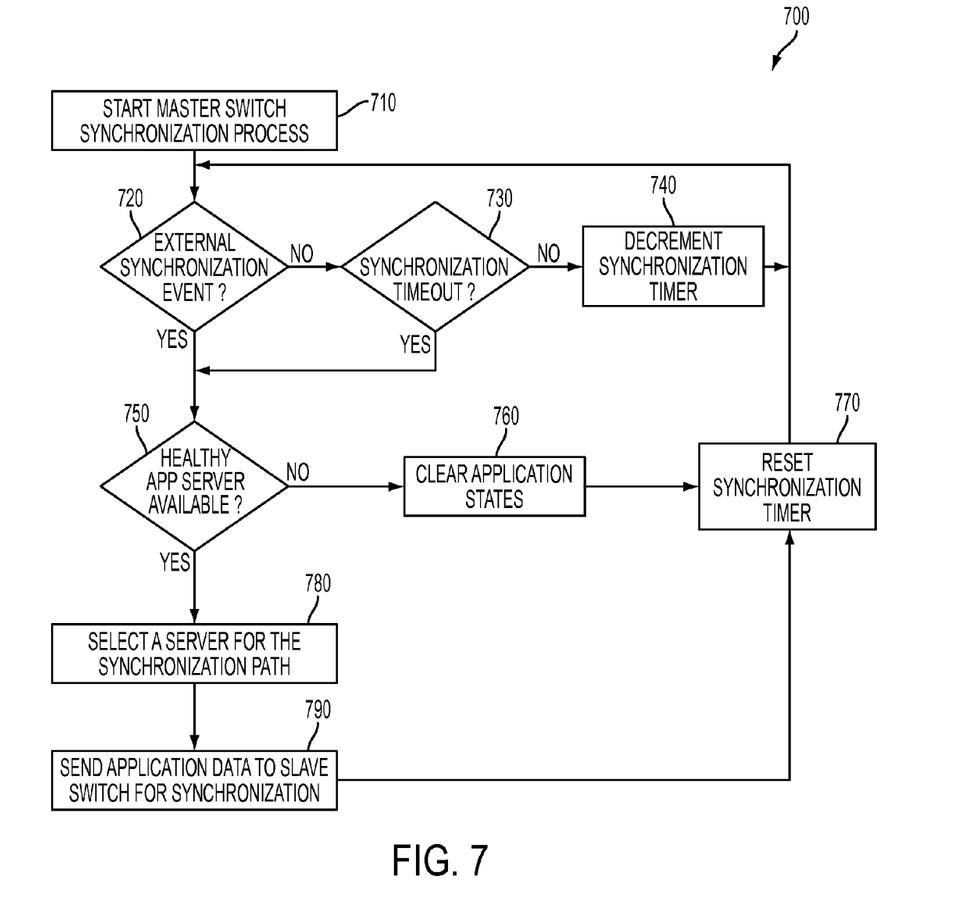
FIG. 7 is a flow chart of a process for synchronization of the master switch of FIG. 2 according to yet another exemplary embodiment of the present invention.

Referring now to FIG. 7, in step 710 a process 700 for checking synchronization availability of the master switch 20-1 may be initiated. In step 720, a determination may be made as to whether an external synchronization event is being made on the system 100. If not, in step 730 a determination for a system time out may be made. If no timeout is determined, then in step 740 a synchronization timer may be decremented and the process may return to step 720. If an external synchronization event is being made, then in step 750 the availability of a healthy application server may be determined. If no healthy application server is available, then in step 760 application states may be cleared in a hash table of the master switch 20-1. In step 770, the synchronization timer may be reset and the process may return to step 720. If a healthy application server is available, then in step 780 a server may be selected providing a synchronization path to the slave switch 20-1. In step 790, application data from the master switch 20-1 to the slave switch 20-2 may be sent and the process continues to step 770 where a synchronization timer may be reset prior to returning to step 720.

Figure 8:
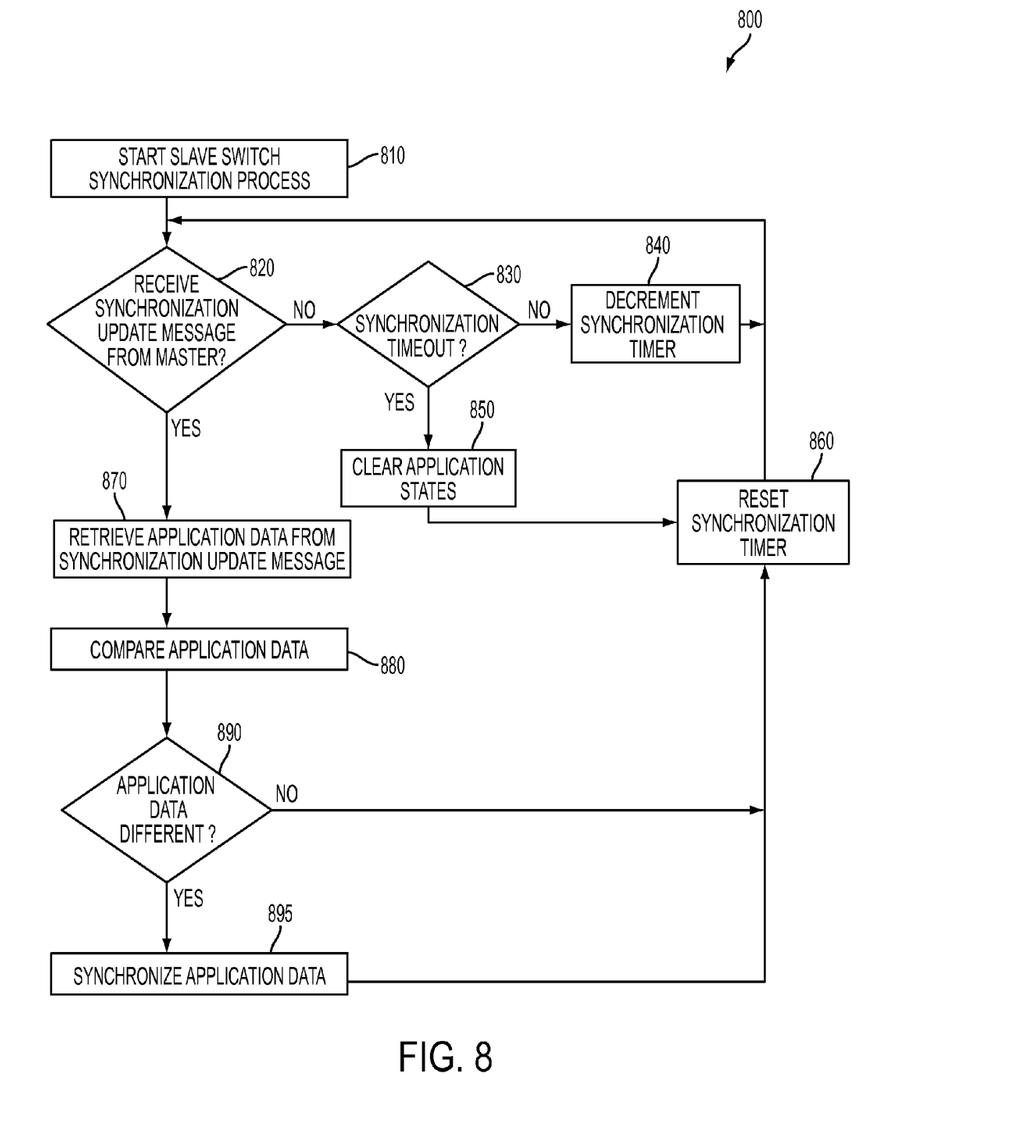
FIG. 8 is a flow chart of a process for synchronization of the slave switch of FIG. 2 according to still yet another exemplary embodiment of the present invention.

Referring now to FIG. 8, in step 810, a process 800 for checking synchronization availability of the slave switch 20-2 may be initiated. In step 820, the slave switch 20-2 may check for a synchronization message request from the master switch 20-1. A synchronization timeout may be determined in step 830 if a synchronization message or a health check request is not periodically received from the master switch. If there is no timeout determined, then in step 840 a synchronization timer may be decremented and the process may return to step 820. If a synchronization timeout occurs, then the application hash table of the slave switch 20-2 may be cleared of application states in step 850 and the process may continue to step 860 where a synchronization timer may be reset. If the slave switch 20-2 receives a synchronization message request from the master switch 20-1 in step 820, then in step 870, the slave switch 20-2 may retrieve application data from the synchronization message. The slave switch 20-2 may compare the application data in step 880 from the synchronization message to application data present in the application hash table of the slave switch 20-2. In step 890, if the application data from the synchronization message does not correspond to the data present in the application hash table of the slave switch 20-2, then in step 895 the slave switch 20-2 application hash table may be updated to correspond to the application hash table of the master switch 20-1. If in step 890 the application data of the respective hash tables already correspond, then there is no need to update and the process continues to step 860 where a synchronization timer may be reset prior to returning to step 820.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A process of synchronizing switches in a network element, comprising:
    determining whether an external synchronization event is being made in the network element, wherein the external synchronization event includes synchronization request application data;
        updating an application hash table of a master switch based on health check results from sending a health check request from the master switch to a slave switch;
        determining availability of a healthy application server from the health check request;
        sending a synchronization update request from the master switch to the slave switch through the healthy application server; and
        updating a hash table of the slave switch to correspond with the hash table of the master switch when the synchronization request application data does not correspond to data present in the application hash table of the slave switch, wherein the slave switch application hash table is not updated when the synchronization request application data corresponds to data present in the application hash table of the slave switch, and wherein the slave switch is configured to clear the slave switch application hash table if a synchronization message is not received from the master switch on a periodic basis.

2. The process of claim 1, including determining a timeout based on lack of response by the slave switch to the health check request.

3. The process of claim 2, including clearing the hash table of the master switch if a timeout is determined.

4. The process of claim 1, including determining the master switch to be failed if the health check request is not received by the slave switch.

5. The process of claim 4, including clearing the hash table of the slave switch if the master switch is determined to be failed.

* * * * *